US009961187B2

(12) United States Patent
Seol et al.

(10) Patent No.: US 9,961,187 B2
(45) Date of Patent: May 1, 2018

(54) METHOD OF OPERATING INTEGRATED MESSAGE APPLICATION AND ELECTRONIC DEVICE SUPPORTING SAME

(71) Applicant: Samsung Electronics Co., Ltd., Gyeonggi-do (KR)

(72) Inventors: Keehwan Seol, Gyeonggi-do (KR); Yongseok Park, Gyeonggi-do (KR); Hyojin Jung, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/000,122

(22) Filed: Jan. 19, 2016

(65) Prior Publication Data

US 2016/0227019 A1    Aug. 4, 2016

(30) Foreign Application Priority Data

Jan. 30, 2015    (KR) .................. 10-2015-0015076

(51) Int. Cl.
*H04W 4/00* (2009.01)
*H04M 1/725* (2006.01)
*H04W 4/12* (2009.01)
*H04L 12/58* (2006.01)

(52) U.S. Cl.
CPC ........ *H04M 1/72552* (2013.01); *H04L 51/16* (2013.01); *H04L 51/36* (2013.01); *H04W 4/12* (2013.01)

(58) Field of Classification Search
CPC .... H04M 1/72552; H04L 51/16; H04L 51/36; H04L 12/589; H04L 12/582; H04W 4/12
See application file for complete search history.

(56) References Cited

U.S. PATENT DOCUMENTS

| | | | |
|---|---|---|---|
| 2006/0053379 A1* | 3/2006 | Henderson | G06F 3/0481 715/751 |
| 2008/0153459 A1* | 6/2008 | Kansal | H04M 1/72547 455/412.1 |
| 2010/0167766 A1* | 7/2010 | Duarte | H04L 12/586 455/466 |
| 2010/0217809 A1* | 8/2010 | Vymenets | G06Q 10/10 709/206 |
| 2012/0072856 A1* | 3/2012 | Park | H04L 12/5815 715/752 |
| 2013/0204888 A1* | 8/2013 | Guzman Suarez | G06F 17/30985 707/758 |
| 2015/0017962 A1* | 1/2015 | Howard | H04W 8/22 455/418 |

* cited by examiner

*Primary Examiner* — Barry W Taylor
(74) *Attorney, Agent, or Firm* — Cha & Reiter LLC.

(57) ABSTRACT

A method comprising: selecting, by an electronic device, a conversation partner; identifying, by the electronic device, one or more message types that are associated with the conversation partner; generating, by the electronic device, a set of one or more tabs corresponding to the message types; and displaying the set of one or more tabs in a user interface for exchanging communications with the conversation partner.

20 Claims, 11 Drawing Sheets

METHOD OF OPERATING INTEGRATED MESSAGE APPLICATION AND ELECTRONIC DEVICE SUPPORTING SAME

CLAIM OF PRIORITY

This application claims the priority under 35 U.S.C. § 119(a) to Korean Application Serial No. 10-2015-0015076, which was filed in the Korean Intellectual Property Office on Jan. 30, 2015, the entire content of which is hereby incorporated by reference.

TECHNICAL FIELD

The present disclosure relates to electronic devices, in general, and more particularly to a method and apparatus for integrated messaging.

BACKGROUND

With the development of information communication technologies and semiconductor technologies, various types of electronic devices have been developed as multimedia devices that provide various multimedia services. For example, a portable electronic device can provide various multimedia services such as a broadcasting service, a wireless Internet service, a camera service, and a music reproduction service.

In general, a message application running in the electronic device provides one compose window to one chat room. Further, a user can write a message on the basis of various message transmission types (a Short Message Service (SMS), a Multimedia Messaging Service (MMS), and an Instant Message (IM)) or various transmission identifiers (an identifier (ID), a phone number, and a Subscriber Identity Module (SIM)). However, since a message application does not separately support a compose window for each transmission type or each transmission identifier, it is difficult for a user to change a message transmission type or a transmission identifier while the user writes a message on the basis of a specific message transmission type and a specific transmission identifier. This is because it is difficult to perform conversion during message composing as transmission formats and protocols are different from each other when message transmission types are different from each other. For example, when a transmission type changes from an IM supporting a text having 10000 characters to an MMS, the MMS maximally supports 2010 characters (example), and thus, it is unavoidable to perform cutting for a text having 2010 characters or more.

Further, since a message application according to the related art has one message compose window for each chat room, it is difficult to temporarily store a message (draft message) for different transmission identifiers. In general, the draft message is restored on the message compose window. Therefore, one compose window cannot store a draft message for each transmission message type and each transmission identifier. For example, an electronic device supporting multi-SIMs cannot distinguishably store a temporarily stored message for SIM 1 and a temporarily stored message for SIM 2. This fact is a problem occurring since only one compose window is provided to the chat room.

SUMMARY

According to aspects of the disclosure, a method is provided comprising: selecting, by an electronic device, a conversation partner; identifying, by the electronic device, one or more message types that are associated with the conversation partner; generating, by the electronic device, a set of one or more tabs corresponding to the message types; and displaying the set of one or more tabs in a user interface for exchanging communications with the conversation partner.

According to aspects of the disclosure, an electronic device is provided comprising: a memory; and at least one processor configured to: select a conversation partner; identify one or more message types that are associated with the conversation partner; generate a set of one or more tabs corresponding to the message types; and display the set of one or more tabs in a user interface for exchanging communications with the conversation partner.

According to aspects of the disclosure, a non-transitory computer-readable medium is provided that stores one or more processor executable instructions which when executed by at least one processor cause the at least one processor to perform a method comprising the steps of: selecting a conversation partner; identifying one or more message types that are associated with the conversation partner; generating a set of one or more tabs corresponding to the message types; and displaying the set of one or more tabs in a user interface for exchanging communications with the conversation partner.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
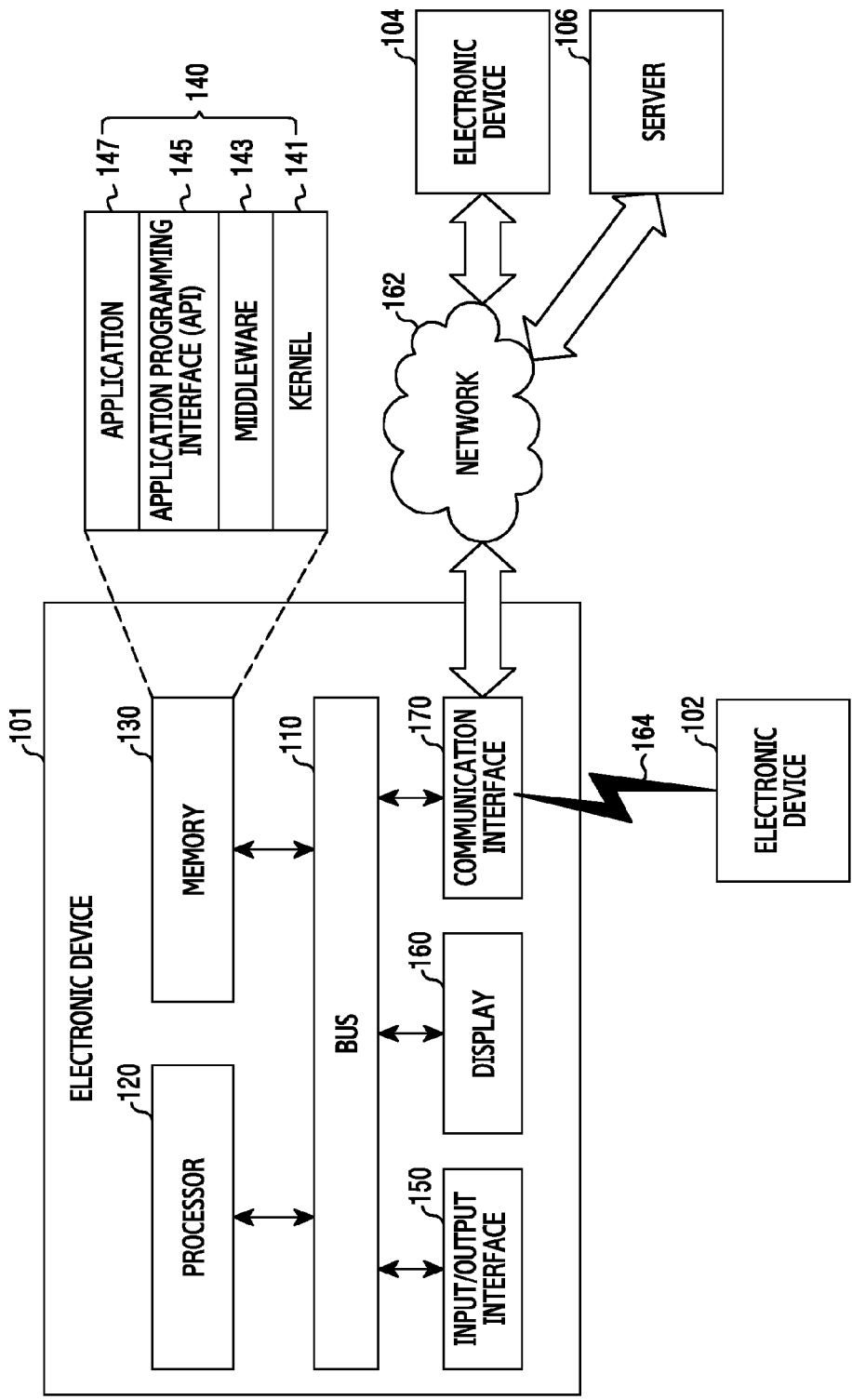
FIG. 1 is a block diagram of an example of an electronic device, according to an embodiment of the present disclosure.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the present disclosure. In addition, descriptions of well-known functions and implementations are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" at the hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

The module or program module according to various embodiments of the present disclosure may further include at least one or more elements among the aforementioned elements, or may omit some of them, or may further include additional other elements. Operations performed by a module, programming module, or other elements according to various embodiments of the present disclosure may be executed in a sequential, parallel, repetitive, or heuristic manner. In addition, some of the operations may be executed in a different order or may be omitted, or other operations may be added.

An electronic device according to various embodiments of the present disclosure may be a device. For example, the electronic device according to various embodiments of the present disclosure may include at least one of: a smartphone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync®, Apple TV®, or Google TV); a game console (e.g., Xbox® PlayStation®); an electronic dictionary; an electronic key; a camcorder; or an electronic frame.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like)

In certain embodiments, an electronic device may include at least one of: a piece of furniture or a building/structure; an electronic board; an electronic signature receiving device; a projector; or various measuring instruments (e.g., a water meter, an electricity meter, a gas meter, or a wave meter).

An electronic device according to various embodiments of the present disclosure may also include a combination of one or more of the above-mentioned devices.

Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

Hereinafter, various embodiments of the present disclosure relate to a technology which can select or change a type of a message to be transmitted from among various message types, on one execution screen, by operating an integrated message application in an electronic device.

FIG. 1 is a block diagram of an example of an electronic device, according to an embodiment of the present disclosure. Referring to FIG. 1, the electronic device 101 may include a bus 110, a processor 120, a memory 130, an input/output (I/O) interface 150, a display 160, and a communication interface 170.

The bus 110 may, for example, be a circuit for connecting the above-described elements (e.g., the processor 120, the memory 130, the input/output (I/O) interface 150, the display 160, or the communication interface 170, etc.) with each other, and transferring communication (e.g., a control message) between the above-described elements.

The processor 120 may include one or more of a central processing unit (CPU), a communication processor (CP), a graphic processing unit (GPU), etc. The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, an application 147, or the like. The each of the programming modules may be configured using software, firmware, hardware, e.g., electronic circuitry, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may, for example, provide an interface for allowing the middleware 143, the API 145, or the application 147 to access an individual element of the electronic device 101 and control or manage the same.

The middleware 143 may, for example, perform a mediation role so that the API 145 or the application 147 may communicate with the kernel 141 to give and take data. Also, in connection with task requests received from the applications 147, the middleware 143 may perform a control function (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may, for example, transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120.

The display 160 may include, for example, a Liquid Crystal Display (LCD), a Light Emitting Diode (LED) display, an Organic Light Emitting Diode (OLED) display, a Micro Electro Mechanical System (MEMS) display, an electronic paper display, or the like. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may provide communication between the electronic device 101 and an external device (for example, the electronic device 104 or the server 106). For example, the communication interface 170 may be connected to a network 162 through wireless communication or wired communication, and may communicate with an external device. The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol. The wireless communication may include at least one of, for example, WiFi, Bluetooth, BLE, Zigbee, Infrared (IR) communication, and ultrasonic communication as a short-range communication protocol 164. The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

According to an embodiment of the present disclosure, the electronic device 101 may provide LTE service in a single wireless environment using at least one module which is separated from the processor 120 functionally or physically.

Figure 2:
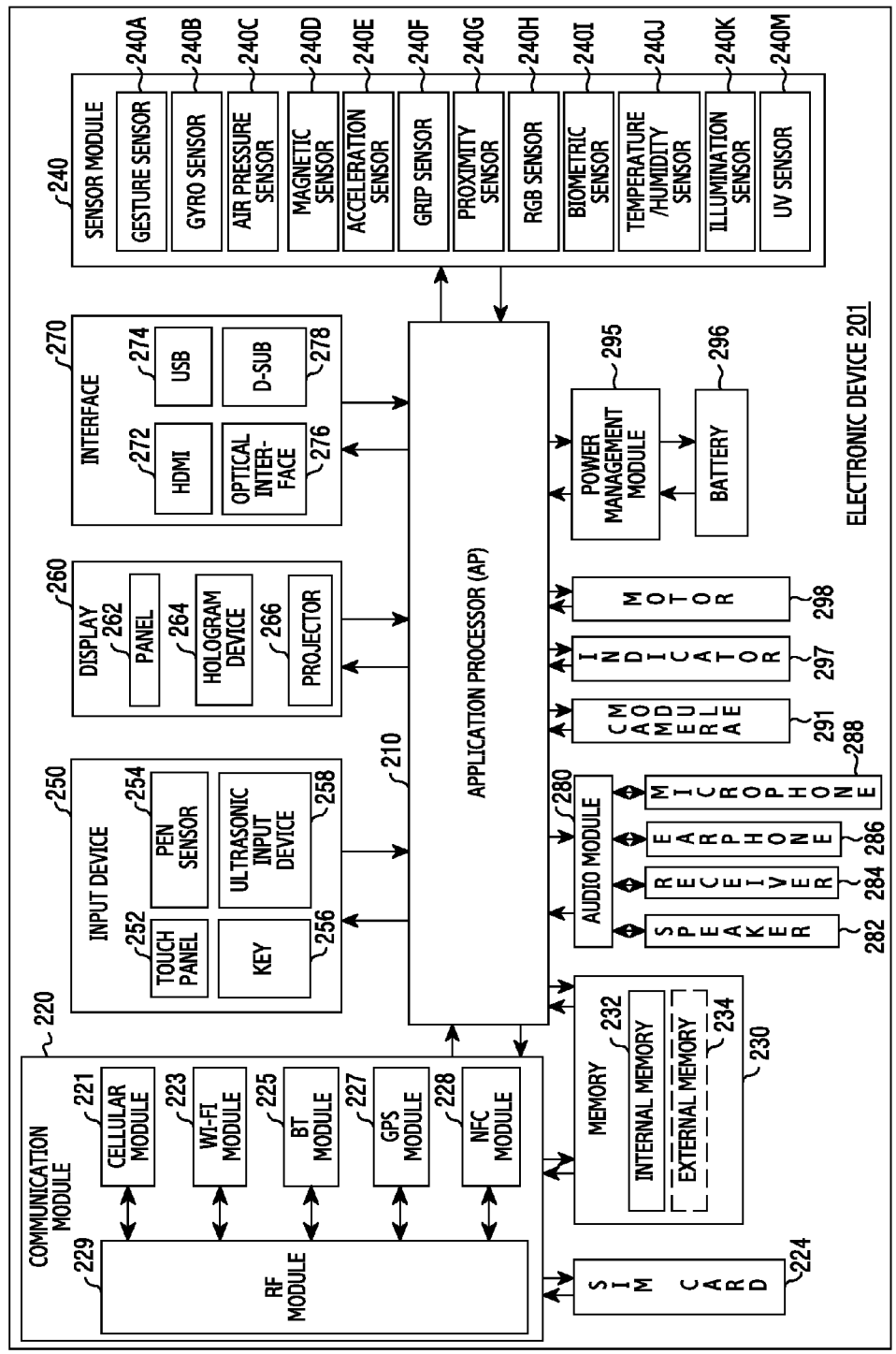
FIG. 2 is a block diagram of an example of an electronic device, according to an embodiment of the present disclosure.

FIG. 2 is a block diagram of an example of an electronic device, according to an embodiment of the present disclosure. The electronic device 201 may constitute, for example, all or a part of the electronic device 101 illustrated in FIG. 1.

The electronic device 201 may include one or more processors (e.g., AP 210), a communication module 220, a subscriber identity module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an application program to control a plurality of hardware or software components connected to the processor 210 and to perform a variety of data processing and operations. The processor 210 may be implemented in a SoC (system on chip). According to an example, the processor 210 may further include a GPU (graphic processing unit) and/or an image signal processor.

The communication module 220 (e.g., the communication interface 170) may, for example, perform data transmission/reception in communication between the electronic device 201 (e.g., the electronic device 100) and other electronic devices (e.g., the electronic device 102 or the server 104) connected via a network. According to an example, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identification module (e.g., a SIM card 224). According to an example, the cellular module 221 may perform at least a portion of functions that may be provided by the processor 210. For example, the cellular module 221 may perform at least a portion of a multimedia control function.

According to an example, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the processor 210 in FIG. 2, according to an example, the processor 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an example, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an example, at least one of the cellular module 221, the Wi-Fi module 223, the BT module 225, the GPS module 227, or the NFC module 228 may perform transmission/reception of an RF signal via a separate RF module.

According to an example, the RF module 229 may include at least one of a main antenna and a sub-antenna which are connected to the electronic device 201. The communication module 220 may support multiple antenna service (ex: MIMO (Multiple Input Multiple Output)) like a diversity using the main antenna and the sub-antenna.

The SIM card 224 may be a card including a subscriber identification module, and may be inserted into a slot formed in a specific position of the electronic device. The SIM card 224 may include unique identity information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an example, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected to the electronic device 201 via various interfaces. According to an example, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (red, green, blue) sensor), a living body sensor 240I, a temperature/humidity sensor 240J, an illuminance sensor 240K, or an ultraviolet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module

240 may further include a control circuit for controlling at least one sensor belonging thereto.

The input unit 250 may include a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an example, the electronic device 201 may receive a user input from an external (e.g., a computer or a server) connected to the communication module 220 using the communication module 220.

The display 260 (e.g., the display 160) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an example, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 150 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage the power supply of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent the introduction of overvoltage or overcurrent from a charger. According to an example, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the processor 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described component elements of hardware according to the disclosure may be configured with one or more components, and the names of the corresponding component elements may vary based on the type of electronic device. The electronic device according to various examples of the disclosure may include at least one of the aforementioned elements. Some elements may be omitted, or other additional elements may be further included in the electronic device. Also, some of the hardware components according to various examples may be combined into one entity, which may perform functions identical to those of the relevant components before the combination.

Figure 3:
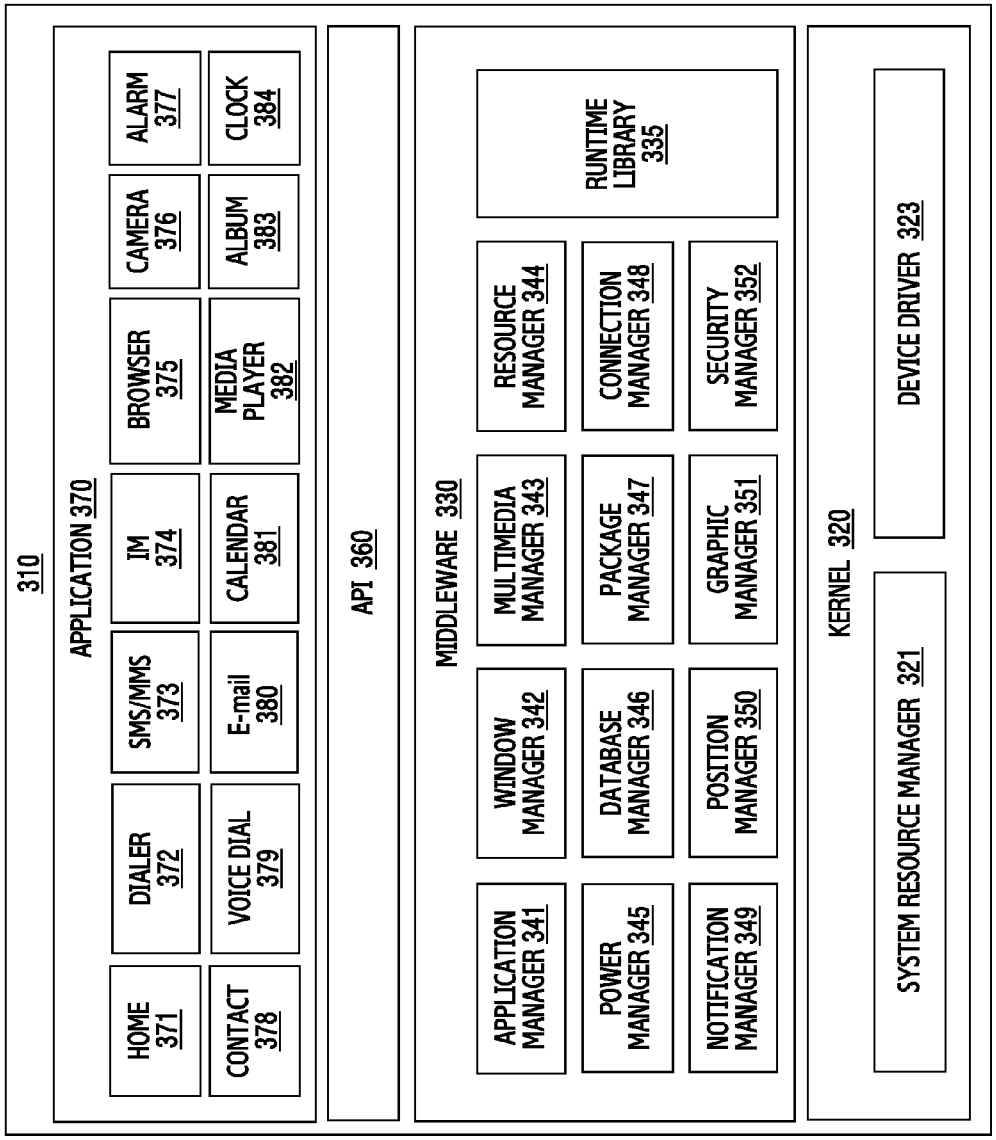
FIG. 3 is a block diagram of an example of a program module, according to various embodiments of the present disclosure.

FIG. 3 is a block diagram of an example of a program module, according to various embodiments of the present disclosure.

According to an example, the program module 310 (for example, the program 140) may include an Operation System (OS) for controlling resources related to an electronic device (for example, the electronic device 101) and/or various applications (for example, the application 147) driven on the OS. For example, the OS may be Android, iOS, Windows, Symbian, Tizen, Bada, or the like.

The program module 310 may include a kernel 320, middleware 330, an Application Programming Interface (API) 360, and/or an application 370. At least part of the program module 310 may be preloaded on the electronic device or downloaded from a server (for example, the server 106).

The kernel 320 (for example, the kernel 141 of FIG. 1) may include a system resource manager 321 or a device driver 323. The system resource manager 321 may control, allocate or collect the system resources. According to an example, the system resource manager 321 may include a process manager, a memory manager, a file system manager, and the like. The device driver 323 may include a display driver, a camera driver, a Bluetooth driver, a shared memory driver, a Universal Serial Bus (USB) driver, a keypad driver, a WiFi driver, an audio driver, or an Inter-Process Communication (IPC) driver, for example.

The middleware 330 may provide functions which are commonly required by the application 370 or may provide various functions to the application 370 through the API 360 such that the application 370 can effectively use limited system resources in the electronic device. According to an example, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

For example, the runtime library 335 may include a library module which is used by a compiler to add a new function through a programming language while the application 370 is executed. The runtime library 335 may perform functions on input/output management, memory management, an arithmetic function, and the like.

The application manager 341 may manage a life cycle of at least one of the applications 370, for example. The window manager 342 may manage GUI resources used in a screen. The multimedia manager 343 grasps a format necessary for reproducing various media files and encodes or decodes the media files by using a Codec suited to the corresponding format. The resource manager 344 may manage resources such as a source code, a memory, or a storage space of at least one of the applications 370.

The power manager 345 operates along with a Basic Input/Output System (BIOS) to manage a battery or power and provide power information necessary for operations of the electronic device. The database manager 346 may generate, search, or change a database which is used in at least one of the applications 370. The package manager 347 may manage installing or updating an application which is distributed in the form of a package file.

The connectivity manager 348 may manage wireless connection of WiFi, Bluetooth, and the like. The notification manager 349 may display or notify an event such as a message arrived, an appointment, a notification of proximity in such a manner that the event does not hinder the user. The location manager 350 may manage location information of the electronic device. The graphic manager 350 may manage a graphic effect to be provided to the user or a relevant user interface. The security manager 352 may provide an overall security function necessary for system security or user authentication. According to an exemplary embodiment, when the electronic device (for example, the electronic device 101) is equipped with a telephony function, the middleware 330 may further include a telephony manager (not shown) to manage a speech or video telephony function of the electronic device.

The middleware 330 may include a middleware module to form a combination of the various functions of the above-described elements. The middleware 330 may provide a module which is customized according to a kind of OS to provide a distinct function. The middleware 330 may dynamically delete some of the existing elements or may add new elements.

The API 360 (for example, the API 145) may, for example, be a set of API programming functions and may be provided as a different configuration according to an OS. For example, in the case of Android or IOS, a single API set may be provided for each platform. In the case of Tizen, two or more API sets may be provided.

The application 370 (for example, the application 147) may include one or more applications for providing functions, such as a home 371, a dialer 372, a Short Message Service (SMS)/Multimedia Messaging Service (MMS) 373, an Instant Message (IM) 374, a browser 375, a camera 376, an alarm 377, a contact 378, a voice dial 379, an email 380, a calendar 381, a media player 382, an album 383, or a watch 384, or health care (for example, measuring exercise or a blood sugar), or providing environment information (for example, information on atmospheric pressure, humidity, or temperature), for example.

Figure 4:
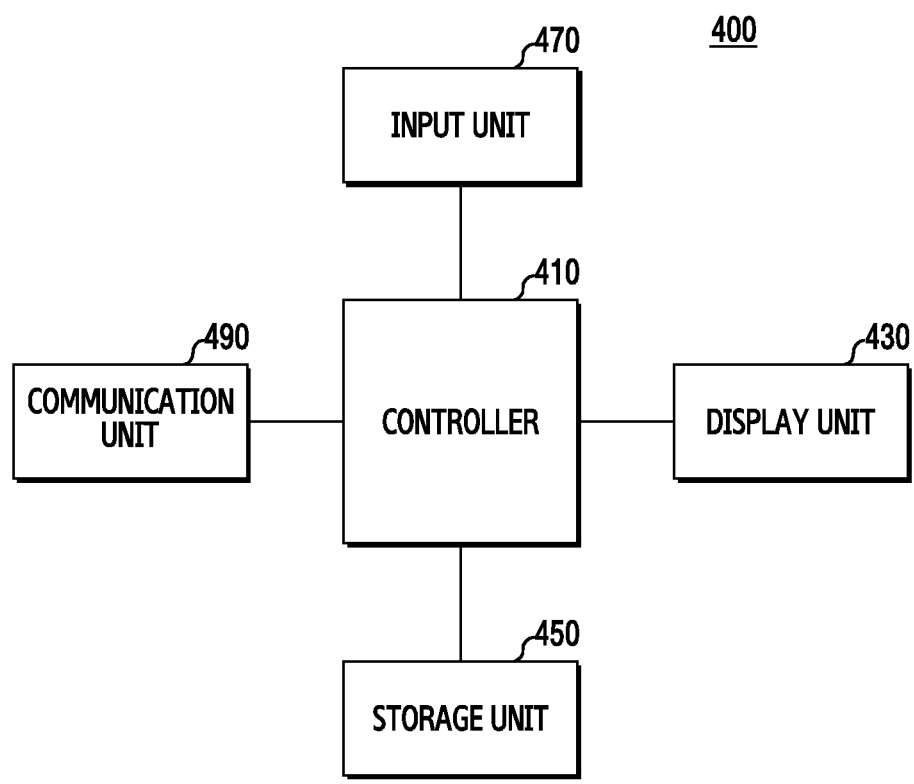
FIG. 4 is a block diagram of an example of an electronic device, according to an embodiment of the present disclosure.

FIG. 4 is a block diagram of an example of an electronic device, according to an embodiment of the present disclosure.

Referring to FIG. 4, an electronic device 400 according to an embodiment of the present disclosure includes: a controller 410, a display unit 430, a storage unit 450, an input unit 470, and a communication unit 490.

The controller 410 may control an overall operation of the electronic device 400, and it may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the controller 410 of the present disclosure can execute an integrated message application. For example, when receiving a message from another electronic device (conversation partner), the controller 410 can automatically execute the integrated message application according to a command which is to identify the message, by a user. At this time, the controller 410 can receive, from the conversation partner, at least one message from among a Short Message Service (SMS)/Long Message Service (LMS)/Multimedia Message Service (MMS) and an Instant Message (IM). Otherwise, the controller 410 can execute a message application in response to a command from a user which is to transmit a message to a specific conversation partner.

In operation, the controller 410 determines whether there is a history of having transmitted/received a message through the integrated message application to/from the corresponding conversation partner, using a database stored in the storage unit 450. For example, the controller 410 may determine whether at least one message is transmitted from the electronic device to the conversation partner in the past. Additionally or alternatively, the controller 410 may determine whether at least one message is received from the conversation partner in the past. According to aspects of the disclosure, determining whether a message is transmitted/received in the past may include determining whether the message is transmitted/received during any specified time period (e.g., in the past 90 days, in the past 6 months, or in the past year.) Alternatively, determining whether the message is transmitted/received in the past may include determining whether the message was transmitted during the life of the electronic or since the last time the electronic device was reset.

When it is determined that the electronic device 400 has a history of having transmitted/received a message to/from the conversation partner using the integrated message application, the controller 410 identifies a type of a message recently transmitted to a specific conversation partner or a type of a message corresponding to a draft message stored in a message compose window. Here, the type of a message refers to a type of a message which can be transmitted/received to/from a conversation partner on the basis of at least one of a message transmission type of the SMS/LMS/MMS and the IM and a message transmission identifier of an ID, a phone number, and a Subscriber Identity Module (SIM) authenticated in an instant messenger application. A message is classified into the SMS, the LMS, and the MMS according to the size of data and is differently charged according to each type of a message. The message(s) may be transmitted by using any suitable type of communications protocol, such as a Long Term Evolution (LTE), a Wibro, and a Wideband Code Division Multiple Access and a wireless Local Area Network (LAN) such as a Wi-Fi, and the IM is transmitted/received through the wireless LAN such as the Wi-Fi. In this way, the message sizes, assigned charges, and used communication means are changed according to different types of messages.

The controller 410 outputs a conversation room recently used with a specific conversation partner through the display unit 430. Further, the controller 410 displays a tab on which a user can select a type of a transmittable message, on a message compose area of the conversation room. According to an embodiment, the controller 410 can activate and display a tab corresponding to a type of a recently-transmitted message or activate and display a tab corresponding to a type of a draft message stored in the compose window. According to another embodiment, the controller 410 can activate and display a tab corresponding to a type of a message determined according to a setting that is specified by the user.

Displaying the above-described tab may include generating and storing by the controller 140 a tab which corresponds to at least one of SMS/LMS/MMS, an IM transmission scheme, an ID authenticated in the IM, a phone number, and a SIM subscriber identification number and is to be displayed in the message compose area. More particularly, the SMS/LMS/MMS are configured by one tab, and contents displayed on the tab may be configured as (or changed to 0 at least one of an SMS, an LMS, and an MMS according to the size of data of a message input by a user. The tab for an IM message may include a name or an abbreviation of an instant messenger application together with an authenticated ID. Further, the controller 410 can configure tabs separately according to different IDs. The tab for a particular SIM can be combined with the tab for a text message, for example, an SMS1 and an SMS2. The tab displaying the SMS1 may imply that a text message is transmitted using a SIM1, and the tab displaying the SMS2 may imply that a text message is transmitted using a SIM2.

The controller 410 detects a tab selection change of the message compose area through the input unit 470. That is, the controller 410 detects whether one tab other than activated tabs is selected by a user, through a past history. The controller 410 activates and displays the selected and changed tab, through the display unit 430, according to a result of the detecting.

Additionally or alternatively, when the tab is not changed by a user, the controller 410 may activate and display a tab corresponding to a recently transmitted message type, activate and display a tab corresponding to a draft message stored with respect to the message compose window, or activate and display a tab corresponding to a message type previously selected by a user, through the display unit 430.

The controller 410 controls the communication unit 490 to acquire information input by a user through the message compose window and transmit the a message including the acquired information when a message transmission request is input by a user. For example, the controller 410 can firstly receive input of information from a user in the message compose window, receive input selecting a tab in order to determine a type of a message to be transmitted, and receive input selecting a transmission icon. Additionally or alternatively, the controller 410 can receive input selecting a tab from a user to determine a type of a message to be transmitted, receive input of a message through the message compose window, and then receive input selecting a transmission icon.

In some implementations, the integrated message application provides a tab menu from which a user can select different message types that are entered by using the same message compose window, and thus, facilitates selection or change of one message type of various message types in one execution screen.

Additionally or alternatively, the controller 410 can display an indication of a maximum permitted message size according to the selected tab on a screen. For example, when a user selects a tab corresponding to an SMS message, the controller 410 can output an indication that only 40 Korean characters, or 80 English characters, numbers, or symbols, can be input (e.g., 80 bytes). Further, when a message exceeding the size limit is input (e.g., a message larger than 80 bytes), the controller 410 can automatically switch a type of the message from an SMS message type to an LMS message type, notify a user that the SMS message is switched to the LMS message due to exceeding the maximum permitted size for the message, change the label of the tab where the message is displayed from "SMS" to "LMS", and output the changed contents. In addition, the LMS message may include a guidance message indicating that 2010 bytes (1000 Korean characters) can be input. Thereafter, when the user input exceeds the maximum permitted size for LMS messages, the controller 410 can automatically switch the type of the message from LMS to MMS, notify a user that the LMS message is switched to the MMS message due to exceeding the maximum permitted size, change contents displayed in the LMS message to the MMS message, and output the changed contents.

The controller 410 controls the communication unit 490 to transmit a message in a communication scheme corresponding to a message type of a finally configured tab.

When receiving a termination request of the integrated message application, the controller 410 terminates execution of the integrated message application.

Meanwhile, when the electronic device 400 firstly uses the integrated message application of the present disclosure in order to transmit/receive a message to/from a specific conversation partner, the controller 410 analyzes a message type transmittable to the corresponding conversation partner.

To this end, the controller 410 can trace a history (e.g., log) of transmitted/received messages to/from the conversation partner. That is, the controller 410 can trace a history of having previously transmitted/received the SMS/LMS/MMS and the IM. More particularly, when SMS/LMS/MMS messages have been transmitted and/or received in the past through a message application, the controller 410 analyzes a message type of the SMS/LMS/MMS as a message type transmittable with the conversation partner. Furthermore, when one or more instant messages have been transmitted in the past through another instant messenger application other than the integrated message application installed in the electronic device 400, the controller 410 analyzes a message type of the IM as a message type transmittable to the conversation partner, and detects whether it is possible to transmit/receive a message via the corresponding IM messenger. Further, the controller 410 may detect whether it is possible to transmit/receive a message through at least one ID authenticated in the instant messenger application.

Further, when there is a history of transmitted/received message(s) by using a specific SIM in a multi-SIM UE, the controller 410 can prioritize the specific SIM from among multiple SIMS. Otherwise, the controller 410 may select a SIM having a high frequency of use from among the multiple SIMS.

On the other hand, the controller 410 can determine whether a phone number of the conversation partner is stored in the electronic device 400 and whether the conversation partner (or friend) is registered in the electronic device 400, in order to select the message type transmittable to the conversation partner. When a phone number of the conversation partner is stored in the electronic device 400, the controller 410 analyzes a message type such as SMS/LMS/MMS as a message type transmittable to the conversation partner. When a conversation partner (or friend) of the IM messenger application is registered, the controller 410 analyzes a message type of an IM as a message type transmittable to the conversation partner.

The controller 410 generates an icon corresponding to the selected message type and outputs the generated icon in the message compose area and the message display area through the display unit 430, thereby distinguishably displaying different message types.

The controller 410 detects that a tab is selected in the message compose area and activates and displays a selected tab through the display unit 430. For example, when no tab is selected by a user, the controller 410 activates a tab corresponding to a default message transmission scheme.

The display unit 430 may include a Liquid Crystal Display (LCD), a Light Emitting Diode (LED) display, an Organic LED (OLED) display, a Micro ElectroMechanical System (MEMS) display, and an electronic paper display. For example, the display unit 430 may be implemented as a touch screen while being coupled to the input unit 470.

In particular, the display unit 430 of the present disclosure can display an execution screen of the integrated message application, and accordingly, display a chatting room window. Herein, the chat room may be divided into the message display area and the message compose area. The display unit 430 displays a transmitted/received message within the message display area using a speech balloon and displays a message type thereof within the speech balloon or in an external area adjacent to the speech balloon to enable a user to identify the message type. To this end, the display unit 430 can display SMS/LMS/MMS, a phone number, a SIM card identification number, a name or an abbreviation of an IM, or an ID authenticated in an instant messenger at an end of the speech balloon or an outer lower area of the speech balloon. The icon may include one or more alphanumerical characters, a picture, a figure, a mark, a symbol, etc. Further, when a tab is activated, the display unit 430 can highlight the tab. By way of example, highlighting the tab may include, causing the tab to flicker when while the tab is hidden behind the message compose window and is then output, or displaying the tab using a different color, a different shape or a different pattern in contrast with other tabs which are not selected.

The storage 450 may include any suitable type of volatile or non-volatile memory, such as Random-access Memory (RAM), Read-Only Memory (ROM), Network Accessible Storage (NAS), cloud storage, a Solid State Drive (SSD), etc. In operation, the storage unit 450 can store operation programs of the electronic device 400. At this time, the storage unit 450 can store a program for executing various functions. Further, the storage unit 450 can store data generated while the programs are executed.

In particular, the storage unit 450 can store the integrated message application, and store data generated as a result of the execution of the integrated message application. More particularly, the storage unit 450 can store a history of using the integrated message application, a message transmitted/received using the integrated message application, a type of a message recently transmitted to a specific conversation partner, a type of a message transmitted by the specific conversation partner, an icon and a tab corresponding to various types of messages transmittable to the specific conversation partner, a draft message input in the message compose window, etc. To this end, the storage unit 450 may include a message database that is searchable based on transmission types (e.g., an SMS, an LMS, an MMS, and an IM) and transmission identifiers (e.g., an ID, a phone number, and a SIM), respectively.

The input unit 470 can generate input data in the electronic device 400. At this time, the input unit 470 can generate the input data to correspond to a user input of the electronic device 400. Further, the input unit 470 may include at least one input means. The input unit 470 may include a keypad, a dome switch, a physical button, a touch panel, a jog & shuttle, and a sensor.

In particular, the input unit 470 of the present disclosure can input a message on the message compose window of the message compose area according to the execution of the integrated message application. Furthermore, the message input in the message compose window need not deleted from the message compose window and may be stored as a draft message before a transmission request is generated by a user. The input unit 470 can generate a touch event in response to any suitable type input, such as a long press on a selected tab for a message type of the message compose area, a drag-and-drop event from the tab to the message compose window.

The communication unit 490 can perform communication in the electronic device 400. At this time, the communication unit 490 can communicate with an external device (not illustrated) in various communication schemes. For example, the communication unit 490 can perform at least one of wireless communication and wired communication. To this end, the communication unit 490 can access at least one of a mobile communication network and a data communication network. Otherwise, the communication unit 490 can perform short-range communication. For example, the external device may include an electronic device, a base station, a server, and a satellite. Further, the communication scheme may include Long Term Evolution (LTE), Wideband Code Division Multiple Access (WCDMA), Global System for Mobile communications (GSM), Wi-Fi, Bluetooth, and Near Field Communication (NFC).

In particular, the communication unit 490 can transmit messages in a manner that results in the lowest cost to the user. For example, when the electronic device 400 tries to transmit an IM through the execution of the integrated message application while communication based on Wi-Fi and LTE is configured, the communication unit 490 can transmit the IM using Wi-Fi in which charge is not generated.

For example, the controller 410 may be a processor 120 of FIG. 1 or an AP 210 of FIG. 2.

Figure 5:
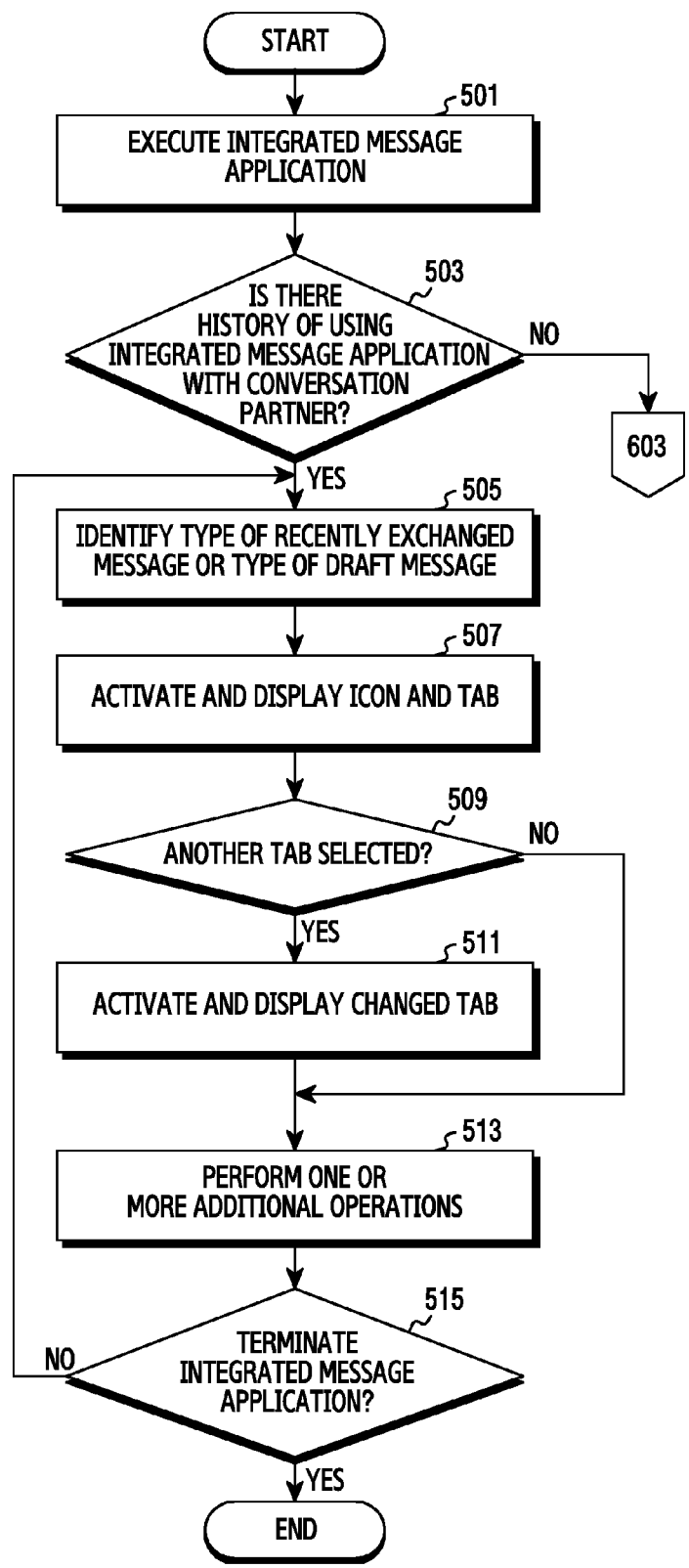
FIG. 5 is a flowchart of an example of a process, according to an embodiment of the present disclosure.

FIG. 5 is a flowchart of an example of a process, according to an embodiment of the present disclosure.

Referring to FIG. 5, in operation 501, the controller 410 can execute a message application. Here, a specific conversation partner is configured. For example, when receiving a message from another electronic device (specific conversation partner), the controller 410 can automatically execute the integrated message application in response to an event that is generated in the electronic device when the message is received from a user. For example, the controller 410 can receive, from the conversation partner, at least one of an SMS, an LMS, an MMS and an IM. Otherwise, the controller 410 can execute a message application according to a command (e.g., input) received from the user, which is to transmit a message to a specific conversation partner.

In operation 503, the controller 410 determines whether there is a history of having transmitted/received, to/from the specific conversation partner, a message through the integrated message application.

When it is determined in operation 503 that the electronic device 400 has a history of having transmitted/received a message to/from the specific conversation partner using the integrated message application, the controller 410 identifies a type of a message recently transmitted to the specific conversation partner or a type of a draft message stored in the message compose window of the corresponding chat room, in operation 505.

For example, the type of the message may include at least one of an SMS/LMS/MMS and IM. Furthermore, any particular message type may be associated with a message transmission identifier of an ID, a phone number, and a SIM authenticated in an instant messenger application. For example, the electronic device 400 can use a plurality of IDs for one instant messenger application. Further, the electronic device 400 supporting multi-SIMs can selectively use one of the plurality of SIMs. Further, one electronic device 400 can use multiple phone numbers.

In operation 507, the controller 410 displays a chat room (e.g., a messaging window) recently used with a specific conversation partner and displays a tab on which a user can select one type of a message transmittable to the chat room. For example, the controller 410 may activate and display a tab corresponding to a type of a recently used message or activate and display a tab corresponding to a type of a draft message stored in the compose window.

To this end, the controller 410 can generate and store a tab corresponding to a type of a message transmittable to each conversation partner in advance. For example, the controller 410 may generate and store a tab which corresponds to at least one of SMS/LMS/MMS, an IM transmission scheme, an ID authenticated in the IM, a phone number, and a SIM subscriber identification number on the basis of a transmittable message and is to be displayed in the message compose area. More particularly, SMS/LMS/MMS messages may be associated with the same tab, and contents displayed on the tab may be configured to be or changed to at least one of an SMS, an LMS, and an MMS according to the size of data of a message input by a user. The tab for an IM message may include a name or an abbreviation of an instant messenger application together with an authenticated ID. Further, the controller 410 can create a separate tab for each ID that is used by the electronic device. The controller 410 can display the tab for a SIM while being combined with the tab for a text message, for example, an SMS1 and an SMS2. Here, the tab displaying the SMS1 may indicate that a text message is transmitted using an SIM1, and the tab displaying the SMS2 may indicate that a text message is transmitted using an SIM2.

The activating and displaying may of the tab may include highlighting the tab. By way of example, highlighting the tab may include causing the selected tab to flicker when the tab is hidden behind the message compose area and then output, displaying the selected tab in a different color, a different shape, or a different pattern in contrast with other tabs which are not selected. The chatroom may include the message display area and the message compose area, and message contents may be displayed in a speech balloon within the message display area.

In addition, the controller 410 may display an icon indicating a type of a transmitted/received message. In some implementations, the icon may include an indication of at least one of the type of the message transmitted/received to/from the specific conversation partner, and an identifier or other information used for transmitting the corresponding type of the message. For example, when the icon is provided to the speech balloon, the message information and the user information may be displayed at an end of the speech balloon or on a lower outer area of the speech balloon. For example, the controller 410 may display SMS/MMS, a phone number, a SIM card identification number, a name or an abbreviation of an IM, and a used ID. As another example, the controller 410 may display, in an icon, at least one of the SMS/MMS, the phone number, the SIM card identification number, the name or the abbreviation of the IM, and the used ID. In some implementations, the icon may include at least one of an alphanumerical character, an image, a figure, a mark or a symbol.

In operation 509, the controller 410 detects whether another tab is selected. That is, the controller 410 detects whether one tab other than an activated tab is selected by a user. The selection may be performed via any suitable type of input that is performed on the tab, such as a long press, a drag-and-drop event from one tab to the message compose window, etc. In other words, the tab that is displayed in default based on past history can be changed according to the selection by a user.

In operation 511, the controller 410 activates and displays the selected tab. Likewise, the activating and displaying may include highlighting the tab. Highlighting the tab may include causing the selected tab to flicker when the tab is hidden behind the message compose area and then output, and displaying the selected tab in a different color, a different shape, or a different pattern in contrast with other tabs which are not selected.

Meanwhile, in operation 509, when the tab activated by the past history is not changed by a user, the controller 410 activates and displays a tab corresponding to a type of a recently transmitted message or activates and displays a tab corresponding to a type of a draft message stored with respect to the message compose window.

In operation 513, the controller 410 may perform one or more other functions associated with the operation of the integrated message application. For example, the controller 410 may acquire information input by a user through the message compose window and transmit a message including the acquired information when a message transmission request is input by the user. For example, the controller 410 can firstly receive input of information from a user on the message compose window, receive input selecting a tab in order to determine a type of a message to be transmitted, and receive input selecting a transmission icon. Additionally or alternatively, the controller 410 can receive input selecting a tab from a user to determine a type of a message to be transmitted, receive input of information through the message compose window, and then receive input selecting a transmission icon.

In this way, the integrated message application provides a tab menu on which a user can select different message types for messages that are entered by using a message compose window, and thus, can facilitate selection or change of one message type of various message types in one execution screen.

Additionally or alternatively, the controller 410 can display an indication of a maximum permitted message size according to the selected tab on a screen. For example, when a user selects a tab corresponding to an SMS message, the controller 410 can output an indication that only 40 Korean characters, or 80 English characters, numbers, or symbols, can be input (e.g., 80 bytes). Further, when a message exceeding the size limit is input is input (e.g., a message larger than 80 bytes), the controller 410 automatically switches a type of the message from an SMS message type to an LMS message type, notifies a user that the SMS message is switched to the LMS message due to exceeding the maximum permitted size for the message, changes contents of the tab displayed in the SMS message to the LMS message, and outputs the changed contents. In addition, the controller 410 may output an indication that 2010 bytes (1000 Korean characters) can be input in an LMS message. Thereafter, when the user input exceeds the maximum permitted size for LMS messages, the controller 410 automatically switches the type of the message from LMS to MMS, notifies a user that the LMS message is switched to the MMS message due to exceeding the maximum permitted size, changes contents displayed in the LMS message to the MMS message, and outputs the changed contents.

In operation 515, in response to receiving a termination request of the integrated message application, the controller 410 terminates execution of the integrated message application.

Figure 6:
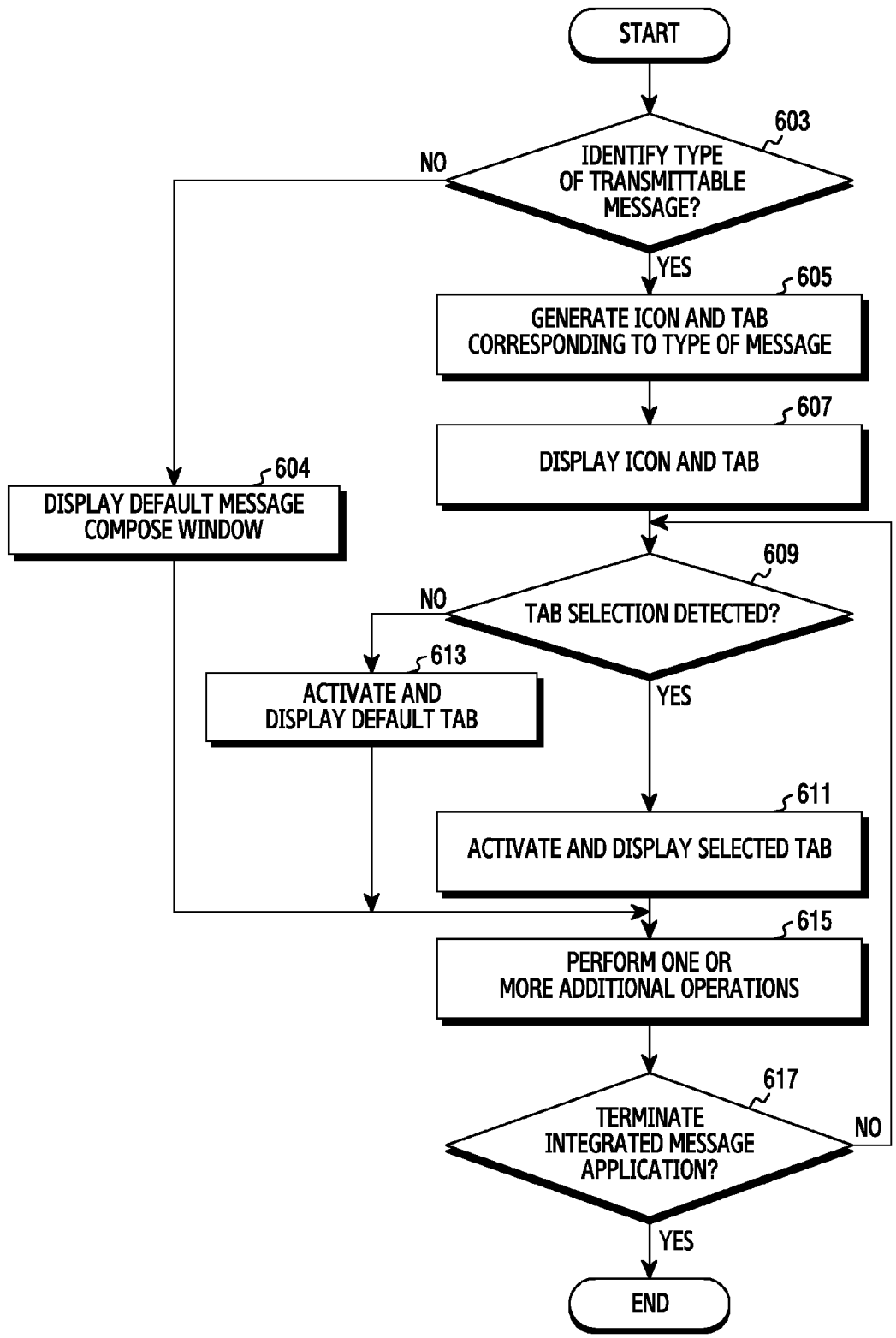
FIG. 6 is a flowchart of an example of a process, according to an embodiment of the present disclosure.

FIG. 6 is a flowchart of an example of a process, according to an embodiment of the present disclosure.

FIG. 6 illustrates an embodiment in which an electronic device has no history of using an integrated message application in order to transmit/receive a message to/from a specific conversation partner in operation 503 of FIG. 5. In other words, FIG. 6 illustrates an embodiment in which the electronic device 400 firstly uses an integrated message application of the present disclosure in order to transmit/receive a message to/from a specific conversation partner.

Referring to FIG. 6, in operation 503, when the electronic device 400 has no history of having transmitted/received a message through the integrated message application to/from the corresponding conversation partner, the controller 410 identifies a type of a message transmittable to the corresponding conversation partner, in operation 603.

For example, the type of the message may include at least one of SMS/LMS/MMS and IM. Furthermore, any particular message type may be associated with a message transmission identifier of an ID, a phone number, and a SIM authenticated in an instant messenger application. For example, the electronic device 400 can use a plurality of IDs for one instant messenger application. Further, the electronic device 400 supporting multi-SIMS can selectively use one of the plurality of SIMS. Further, one electronic device 400 can use multiple phone numbers.

In some implementations, the controller 410 can trace a history of transmitted/received messages to/from the conversation partner. For example, the controller 410 can trace a history of transmitted/received at least one of an SMS, an LMS, and an MMS to/from a conversation partner through a previously used text message application or a history of having transmitted/received an IM through another instant messenger application installed in the electronic device 400 other than the integrated message application of the present disclosure. When there is a history of having transmitted/received at least one of an SMS, an LMS, and an MMS message, the controller 410 analyzes a message type of the SMS, the LMS, and the MMS as a message type transmittable to the conversation partner. Additionally or alternatively, when there is a history of having transmitted/received an IM, the controller 410 analyzes a message type of the IM as a message type transmittable to the conversation partner, and analyzes that it is possible to transmit/receive a message through the corresponding instant messenger application. Further, when there is a history of having transmitted/received a message on the basis of a specific SIM in a multi-SIM UE, the controller 410 can give a higher priority to the specific SIM than any other SIMS that are present on the electronic device and/or make the specific SIM default.

On the other hand, the controller 410 can determine whether a phone number (or another unique identifier) of the conversation partner is stored in the electronic device 400 and whether a conversation partner (or friend) of the IM messenger application installed in the electronic device 400 other than the integrated message application of the present disclosure is registered in the electronic device 400, in order to select the message type transmittable to the conversation partner. When a phone number of the conversation partner is stored in the electronic device 400, the controller 410 may select one of SMS/LMS/MMS as a message type transmittable to the conversation partner. When a conversation partner is registered as a conversation partner (or friend) in the IM messenger application, the controller 410 may select a message type of an IM through the corresponding instant messenger application as a message type transmittable to the conversation partner.

In operation 605, the controller 410 generates an icon and a tab corresponding to the message type selected in operation 603.

In detail, the controller 410 generates a tab on which a user can select at least one of SMS/LMS/MMS, an IM transmission scheme, an ID authenticated in the IM, a phone number, and a SIM subscriber identification number on the basis of a message transmittable to the message compose area and is to be displayed in the message compose area. The SMS/LMS/MMS may be associated with the same tab, and contents displayed on the tab may be configured to be or changed to at least one of an SMS, an LMS, and an MMS according to the size of data of a message input by a user. The tab for an IM message may include a name or an abbreviation of an instant messenger application together with an ID associated with the instant messenger application that belongs to the user of the electronic device. Further, the controller 410 can configure tabs separately according to different IDs. The tab for a SIM can be displayed while being combined with the tab for a text message, for example, can be displayed as SMS1 and SMS2. For example, the tab displaying the SMS1 may indicate that a text message is transmitted using an SIM1, and the tab displaying the SMS2 may indicate that a text message is transmitted using an SIM2.

Further, the controller 410 generates an icon which displays a speech balloon corresponding to a transmission/reception message on the message display area and displays a message type such as an SMS, an LMS, an MMS, and an IM and a transmission identifier such as a used ID, a phone number, and a SIM in an area adjacent to the speech balloon to allow a user to identify the message type and the transmission identifier. The controller 410 can generate the icon in order to display the SMS, the LMS, the MMS, the phone number, the SIM card identification number, the name or the abbreviation of the instant messenger application, or the used ID. The icon may include at least one of a text such as a character or a number or in a form of an image, a figure, a mark or a symbol.

In operation 607, the controller 410 outputs the icon and the tab generated in operation 605 to the message display area and the message compose area, thereby distinguishably displaying different message types.

For example, the controller 410 can display the tab adjacently to an upper side of the message compose window. Further, the controller 410 displays tabs apart from each other, thereby allowing a user to select at least one of SMS/LMS/MMS, a IM, a SIM, a phone number and an ID. IM tabs may be configured for each instant messenger application and may be configured for each of a plurality of accounts for one instant messenger application. When the electronic device 400 supports multiple SIMS, the controller 410 configures a tab so as to select one of the multiple SIMS. The controller 410 displays a type of a transmitted/received message in a speech balloon or in an area adjacent to the speech balloon within the message display area.

In operation 609, the controller 410 detects a selection of a tab in the message compose area (e.g., the message compose window). That is, the controller 410 detects whether a user selects one tab among tabs corresponding to different message types. The selection may be made by performing any suitable type of gesture on the tab, such as long press, a drag-and-drop event from one tab to the message compose window, etc. As a result of the tab selection, one message transmission scheme may be selected from among a plurality of message transmission schemes.

In operation 611, the controller 410 activates and displays the selected tab. When the tab is activated, the tab may be highlighted. Highlighting the tab may include causing the selected tab to flicker when the tab is hidden behind the message compose area and then output, and displaying the selected tab in a different color, a different shape, or a different pattern in contrast with other tabs which are not selected.

Meanwhile, when no tab selection is detected in operation 609, the controller 410 activates a tab corresponding to the default message transmission scheme configured as a default, in operation 613. When a message is initially received from a conversation partner and a message application is activated, the controller 410 can configure a message type identical to a type of the message received from the conversation partner, as a default message type. Otherwise, when the electronic device 400 is a UE supporting multiple SIMs, the controller 410 can configure a SIM frequently used by a user, as a default SIM. Otherwise, in a situation in which Wi-Fi is supported, the controller 410 can configure a message type corresponding to an instant messenger application as a default message type. Otherwise, the controller 410 can configure a tab corresponding to a message type previously selected by a user, as a default.

In operation 615, the controller 410 performs one or more additional operations. For example, the controller 410 may acquire, as a message, information input by a user through the message compose window and transmit the acquired message when a message transmission request is input by a user. For example, the controller 410 can firstly receive input of information from a user on the message compose window, receive input selecting a tab in order to determine a type of a message to be transmitted, and receive input selecting a transmission icon. Additionally or alternatively, the controller 410 can receive input selecting a tab from a user to determine a type of a message to be transmitted, receive input of information through the message compose window, and then receive input selecting a transmission icon.

In some implementation, the controller 410 can display an indication of maximum message size according to the selected tab on a screen. For example, when a user selects a tab corresponding to an SMS message, the controller 410 that no more than 40 Korean characters, or 80 English characters can be input. Further, when a message exceeding the maximum permitted size is input, the controller 410 automatically switches a type of the message from an SMS message type to an LMS message type, notifies a user that the SMS message is switched to the LMS message due to excessing of capacity, changes contents of the tab displayed in the SMS message to the LMS message, and outputs the changed contents. In addition, the controller 410 may output an indication that a maximum of 2010 bytes (1000 Korean characters) can be input in an LMS message. Thereafter, when a user input exceeds a capacity of the LMS message, the controller 410 can automatically switch the type of the message from the LMS message type to the MMS message type, notify a user that the LMS message is switched to the MMS message due to excessing of a capacity, change contents displayed in the LMS message to the MMS message, and output the changed contents.

In operation 617, in response to receiving a termination request of the integrated message application, the controller 410 terminates execution of the integrated message application.

FIGS. 7 to 11 are diagrams of an example of a user interface, according to an embodiment of the present disclosure.

Figure 7:
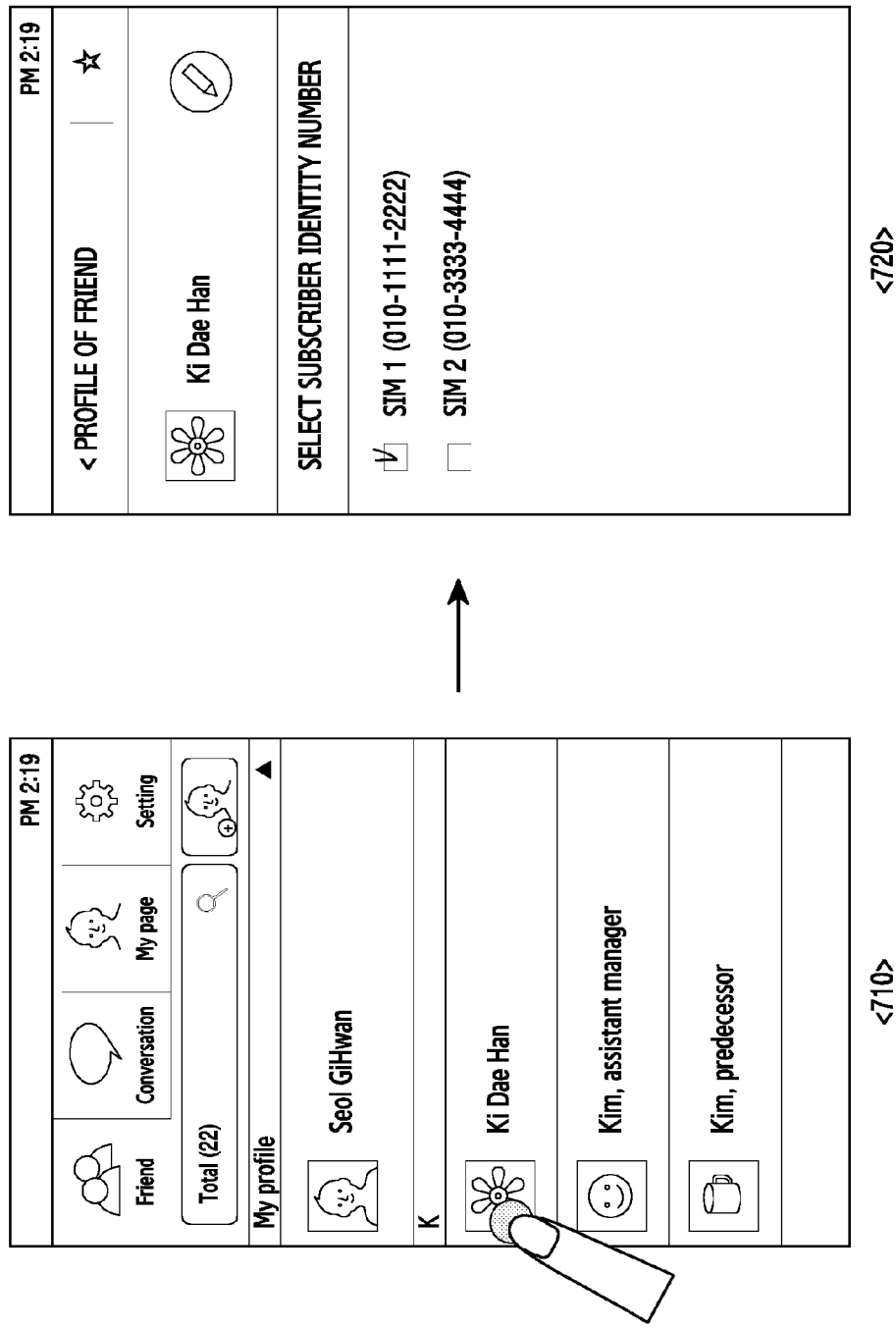
FIG. 7 is a diagram of an example of a user interface, according to an embodiment of the present disclosure.

In the description of FIG. 7 with reference to FIGS. 5 and 6, when the integrated message application is executed as in operation 501 of FIG. 5, the controller 410 can display an execution screen through the display unit 430, such as the execution screen 710 of FIG. 7. For example, the execution screen 710 may be selected when a user selects an icon corresponding to the integrated message application displayed on a main screen (or, a home screen and an application list screen) in order to transmit a message to a specific conversation partner. The controller 410 can control the execution of the integrated message application and output, through the display unit 430, a conversation partner selection window on which a user can select a conversation partner as in the execution screen 710, in response to a user input selecting the icon.

When a specific conversation partner "Ki DaeHan" on the conversation partner selection window is selected by a user input (e.g., a touch), the controller 410 determines whether there is a history of past communications with the conversation partner "Ki DaeHan" through the integrated message application as in operation 503. As discussed above, a history of past communications may exist when at least one message is transmitted from the electronic device to conversation partner in the past and/or when at least one message is received at the electronic device from the conversation partner in the past.

At this time, when there is no history of past communications with the conversation partner "Ki DaeHan" through the integrated message application, the controller 410 selects a type of a message transmittable to the conversation partner "Ki DaeHan" as in operation 603.

When a phone number of the conversation partner "Ki DaeHan" is registered in a phone book of the electronic device 400 and is registered as a friend of instant messenger applications called a first message type (e.g., an SMS1), a second message type (e.g., Chat-on), and a third message type (e.g., Hang-out), and the electronic device 400 supports the SIM1 and the SIM2, the controller 410 generates an icon and a tab corresponding to the selected message type as in operation 605.

As illustrated, the controller 410 can output, through the display unit 430, an execution screen 720 to receive, from a user, input selecting which one of the SIM1 and the SIM2 is to be used. In contrast, when the electronic device 400 supports one SIM, the displaying of the execution screen 720 may be omitted.

When the SIM1 is selected on the execution screen 720 by the user, the controller 410 displays a chat room (e.g., a messaging window) for conversation with the conversation partner (e.g., "Ki DaeHan") corresponding to the selection by a user. The chat room may be divided into a message display area 732 and a message compose area 734 as illustrated in an execution screen 730. When displaying the chat room, as in operation 607, the controller 410 outputs in the message compose area 734 the generated icon and tab that correspond to the selected message type(s). For example, the controller 410 can display message types transmittable to the conversation partner "Ki DaeHan" using a tab menu as illustrated in the execution screen 730. The displaying of the tab menu is provided such that a user can select one of the transmittable message types.

Figure 8:
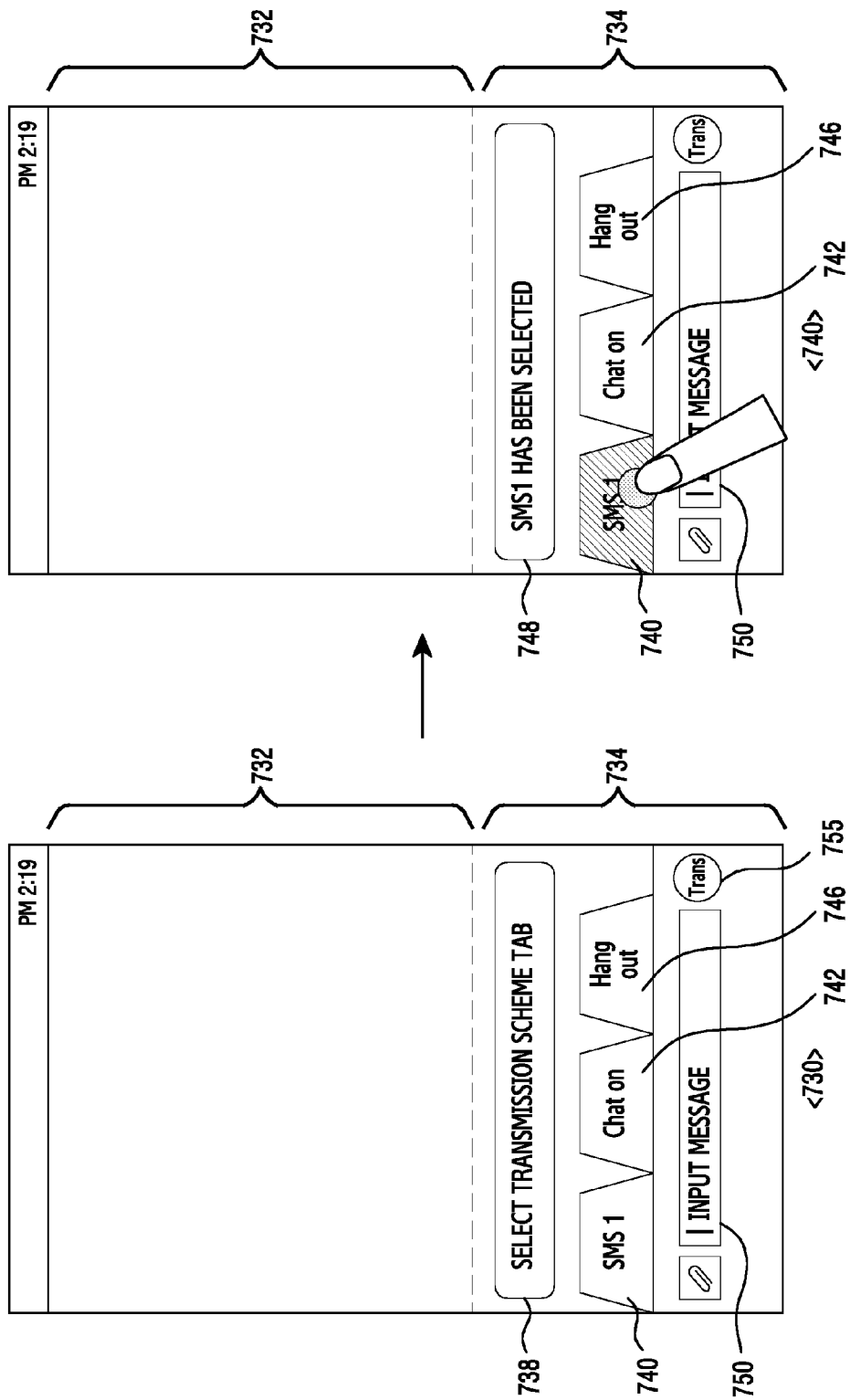
FIG. 8 is a diagram of an example of a user interface, according to an embodiment of the present disclosure.

Referring to FIG. 8 the chat room of the execution screen 730 includes an SMS1 tab 740 for the transmission of SMS/LMS/MMS by using the SIM1, a tab 742 for transmitting messages of the Chat-on messenger application, and a tab 746 for transmitting messages of the Hang-out messenger application.

When the tabs 740, 742, and 746 cannot be displayed on one screen, the controller 410 can make the tab menu scrollable.

A message compose window 750 may be displayed underneath the tabs, and an icon for inputting a message transmission command may be displayed in an area adjacent to the message compose window 750.

When a screen is switched from the execution screen 720 to the execution screen 730, the controller 410 outputs a prompt "please, select transmission scheme tab" 738 to the area adjacent to the tabs 740, 742, and 746, thereby allowing a user to recognize that the user can select various message transmission schemes.

Thereafter, when one tab (e.g., the SMS1 tab 740) is selected by a user, the controller 410 outputs a prompt "SMS1 transmission scheme is selected" 748 as in the execution screen 740, thereby allowing a user to identify the selected tab.

Figure 9:
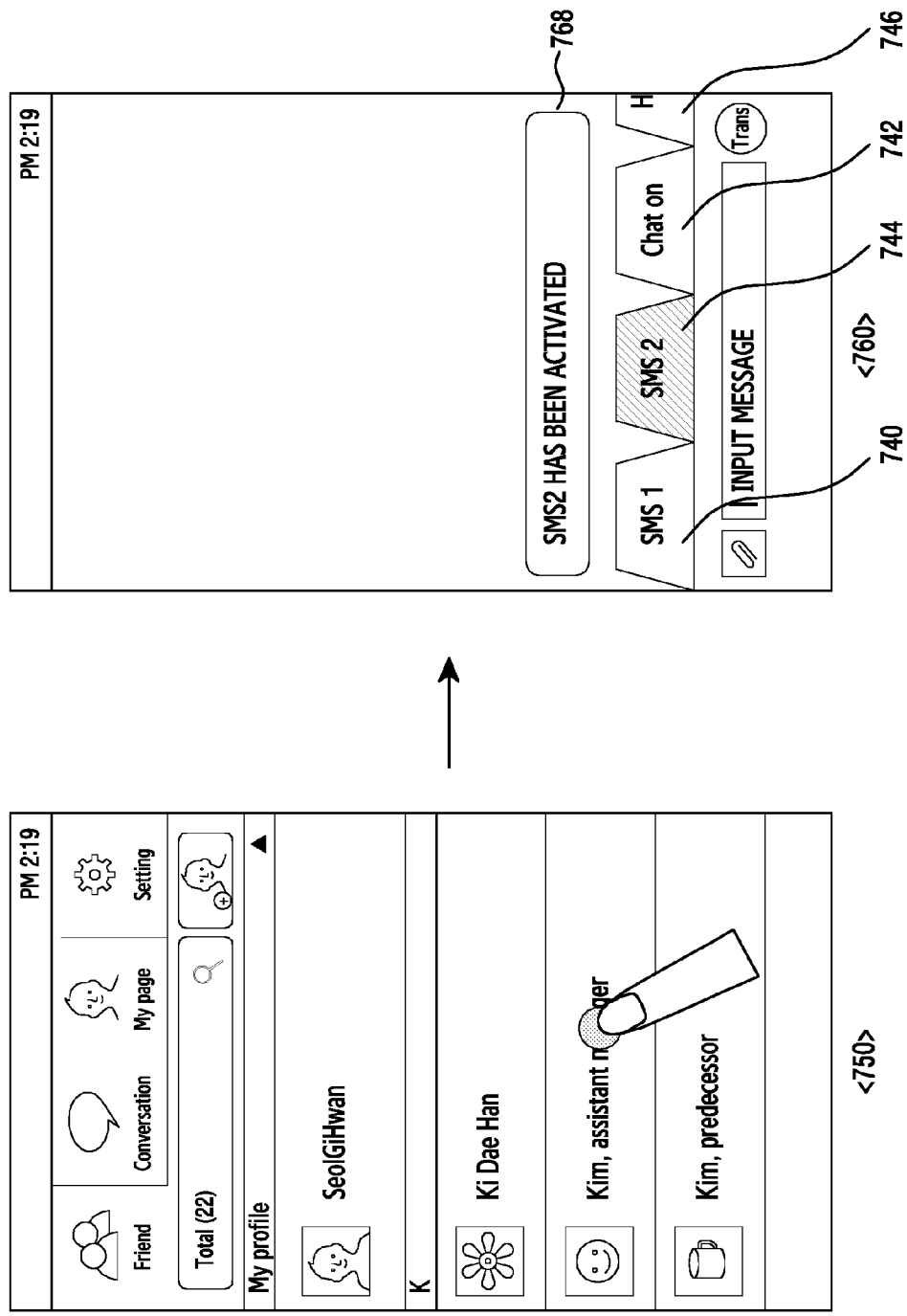
FIG. 9 is a diagram of an example of a user interface, according to an embodiment of the present disclosure.

Referring to FIGS. 9 and 5, when the integrated message application is executed as in operation 501 of FIG. 5, the controller 410 can display an execution screen 750 of FIG. 9 through the display unit 430. For example, when a user selects an icon corresponding to the integrated message application displayed on a main screen (or, a home screen and an application list screen) in order to transmit a message to a specific conversation partner, the controller can execute the integrated message application. The controller 410 can control the execution of the integrated message application and output, through the display unit 430, a conversation partner selection window on which a user can select a conversation partner as in the execution screen 750, in response to a user input selecting the icon.

When a specific conversation partner "Kim, Assistant manager" on the conversation partner selection window is selected by a user input (e.g., a touch), the controller 410 determines whether there is a history of past communications with the conversation partner "Kim, Assistant manager" through the integrated message application as in operation 503.

At this time, when there is a history of past communications with "Kim, Assistant manager" through the integrated message application, the controller 410 identifies a type of a message recently transmitted to "Kim, Assistant manager" or a type of a message corresponding to a draft message correspondingly stored in the message compose window of the corresponding chat room. Examples of different message types, such as a first message type (e.g., an SMS1), a second message type (e.g., an SMS2), a third message type (e.g., Chat-on), and a fourth message type (e.g., Hang-out) are shown in FIG. 9.

The controller 410 displays, through the display unit 430, a chat room (e.g., a messaging window) in which a user can converse with "Kim, Assistant manager" as in an execution screen 760 as in operation 507. At this time, the chat room may include a tab menu comprising an SMS1 tab 740, an SMS2 tab 744, a Chat-on tab 742, and a Hang-out tab 746. The user can use the tabs to select the type of the message that will be transmitted to "Kim, Assistant manager". By default, the controller 410 activate and/or display a tab (e.g., the SMS2 tab 744) corresponding to the type of a recently-used message or activates and displays a tab corresponding to the type of a draft message stored in the message compose window. In the execution screen 760, the controller 410 activates and displays the SMS2 tab 744 corresponding to a type of a message previously transmitted to "Kim, Assistant manager". The activating and displaying may include highlighting the SMS2 tab 744. Highlighting the tab may include causing the selected tab to flicker when the tab is hidden behind the message compose area and then output, and displaying the SMS2 tab 744 in a different color, a different shape, or a different pattern in contrast with other tabs (740, 742, and 746) which are not selected.

As in operation 509, the controller 410 can determine whether tab selection of the message compose area is changed. For example, after the controller 410 automatically activates one of the tabs by default, the controller may determine whether another tab is selected.

Figure 10:
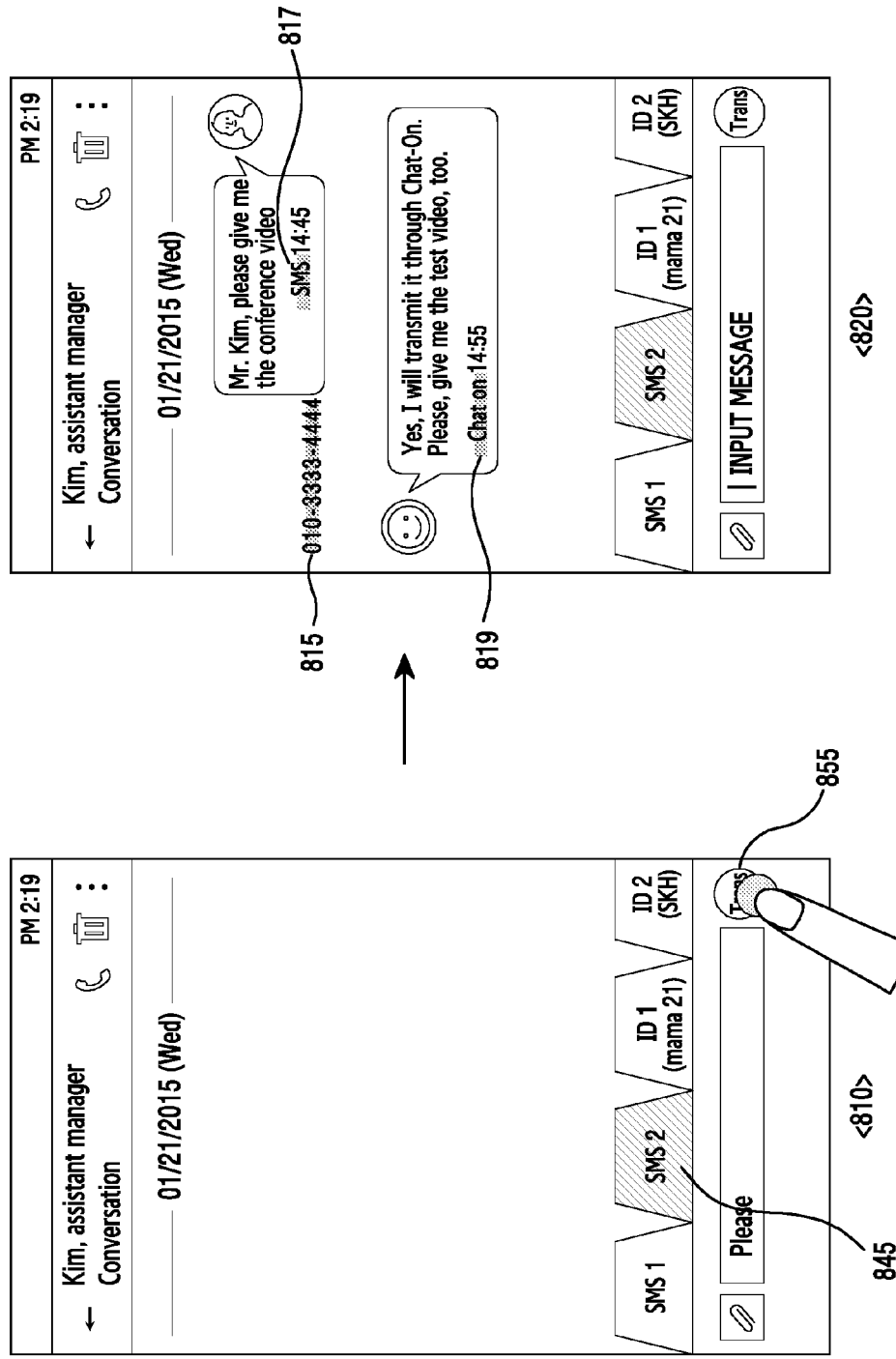
FIG. 10 is a diagram of an example of a user interface, according to an embodiment of the present disclosure.
Figure 11:
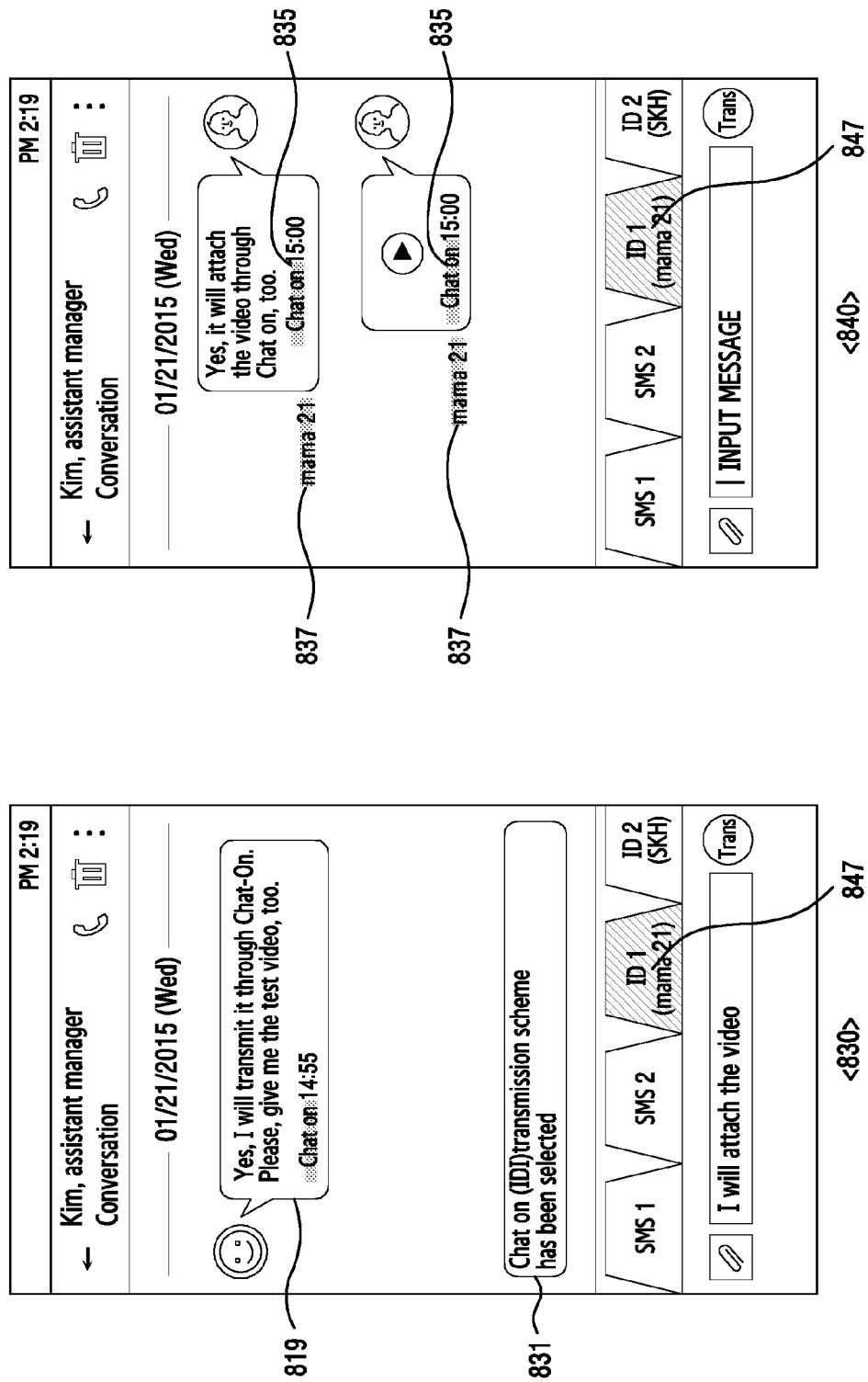
FIG. 11 is a diagram of an example of a user interface, according to an embodiment of the present disclosure.

When it is detected in operation 509 that there is no further tab selection by a user, the controller 410 displays the automatically activated tab (e.g., the SMS2 tab 845) as illustrated in an execution screen 810 of FIG. 10.

When a user requests transmission of a message "Assistant manager, please give me the conference video" (e.g., selects (touches) an icon 855 for a transmission command) while the SMS2 tab 742 is activated as in an execution screen 810, the controller 410 displays the message "Assistant manager, please give me the conference video" corresponding to a user input, within a speech balloon in the chat room, displays message information 817 (e.g., an SMS) for the corresponding message type underneath the message within the speech balloon, and outputs, to a front side of the speech balloon, a phone number (010-3333-4444) 815 of the user corresponding to user information (e.g., identification information and SIM2) of the user who transmits a message according to the corresponding message type.

Further, the controller displays an IM received from the conversation partner (e.g., Kim, Assistant manager) in the chat room. At this time, the controller 410 displays, within the speech balloon, message information 819 indicating that the IM is a message of the Chat-on messenger application.

When it is detected in operation 509 that another tab is selected by the user, the controller 410 activates and displays the selected tabs in operation 511. For example, the controller 410 detects that the tab 847 is selected as in an execution screen 830 of FIG. 11. The tab 847 may be selected by performing any suitable type of user input on the tab 847, such as a long press, a drag-and-drop event from one tab to the message compose window, etc. In other words, the tab that is automatically activated by the controller 410 based on past communications history can be changed according to the selection by a user.

As in operation 511, when the selected tab is activated, the controller 410 can highlight the selected tab. Highlighting the tab may include causing the selected tab to flicker while the tab is hidden behind the message compose window and is then output, or displaying the corresponding tab using a different color, a different shape or a different pattern in contrast with other tabs which are not selected. In addition, the controller 410 outputs, through the display unit 430, a notification "Chat-on (ID1) transmission scheme is selected" 831 in order to allow a user to identify the fact that the tab is changed.

Thereafter, as in operation 513, the controller 410 performs one or more additional operations. As in the execution screen 830, the controller 410 receives input of a message through the message compose window, and transmits the message to the conversation partner (e.g., Kim, Assistant manager) and displays the message in a speech balloon in when the user issues a transmission command. For example, the controller 410 can firstly receive input of information from a user in the message compose window, receive input selecting a tab in order to determine a type of a message to be transmitted, and receive input selecting a transmission icon. Additionally or alternatively, when a user selects a tab, the controller 410 can determine a type of a message to be transmitted, receive input of information through the message compose window, and then receive input selecting a transmission icon.

An execution screen 840 illustrates an example in which a message including video is transmitted on the basis of the Chat-on instant messenger application. For example, as in the execution screen 840, when a user transmits messages while the ID1 (mama21) tab 847 is activated, the messages (e.g., the string "Yes, I will transmit the test video through Chat-on, too." and an attachment) are displayed in different speech balloons. As described above, message information (e.g., Chat-on) 835 identifying a type of the corresponding messages is displayed underneath the speech balloons, and the ID (mama21) 837 corresponding to the user sending the messages (e.g., identification information ID1) is output to the left of the speech balloons according to the type of the messages.

As in the execution screens 810, 820, 830 and 840, the controller 410 can display which message transmission type (the SMS, the LMS, the MMS and the IM) along with an indication of the transmission identifier (the IM/the ID, the phone number and the SIM) that is used to transmit each message.

Meanwhile, the integrated message application can arrange messages having been transmitted/received to/from a specific conversation partner, in a temporal order. In contrast, the arrangement may be performed in a reverse temporal order. Further, although not illustrated, the message may be displayed on a new chat room while it is being classified according to type.

In some implementations, messages transmitted/received in IM and SMS/LMS/MMS schemes and messages transmitted/received by using different SIMS (the SIM1 and the SIM2), different IDs (ID1: mama21 and SKH), and different phone numbers may be displayed in the same chat room.

As described above, the integrated message application of the present disclosure allows transmission of a message by selecting one of various transmission types (the SMS/the LMS/the MMS and the IM) and one of various transmission identifiers (the IM/the ID, the phone number and the SIM). Accordingly, in selecting a method of transmitting a message to a user, since an intuitive UI is provided, the user can easily and conveniently transmit a message in a desired message type. Furthermore, the integrated messaging application may give preference to messages which are advantageous from a cost perspective. For example, in transmitting a message using an integrated message application, when a communication scheme using SMS/LMS/MMS is inexpensive and a specific SIM of a multi-SIM UE is inexpensive, a user can transmit a message by directly selecting a message type of an SMS corresponding to the specific SIM from the message compose window.

Further, when a stored draft message is restored, a draft message corresponding to each message type can be stored and restored. Thus, a larger number of draft messages can be stored and used as compared with one draft message for one compose window provided by a message application according to the related art.

An embodiment of the present disclosure can provide a method of operating an integrated message application and an electronic device supporting the same, the method supporting a plurality of message types or a plurality of identifiers and providing a compose window for each type or each identifier to one chat room, thereby facilitating a change of a type and a change of an identifier.

Further, an embodiment of the present disclosure can provide a method of operating an integrated message application and an electronic device supporting the same, the method temporarily storing and restoring a message according to each transmission type and each transmission identifier and storing a plurality of draft messages in the electronic device, thereby improving the usability thereof.

The integrated message application of the present disclosure allows transmission of a message by selecting one from various transmission types (the SMS/the LMS/the MMS and the IM) and one from various transmission identifiers (the ID, the phone number and the SIM). Accordingly, by selecting a method of transmitting a message to a user, since an intuitive UI is provided, a user can easily and conveniently transmit a message in accordance with a desired message type. In addition, a message type which is advantageous from a cost perspective is selected for transmitting a message. For example, in a transmitting a message using an integrated message application, when a communication scheme using SMS/LMS/MMS is inexpensive and a specific SIM of a multi-SIM UE is inexpensive, a user can transmit a message by directly selecting a message type of an SMS corresponding to the specific SIM from the message compose window. Further, when a stored draft message is restored, a draft message corresponding to each message type can be stored and restored. Thus, a larger number of draft messages can be stored and used as compared with one draft message for one compose window provided by a message application according to the related art.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

FIGS. 1-11 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been shown and described with reference to certain embodiments thereof, it will be apparent to those skilled in the art that the camera lens module according to the present disclosure is not limited to these embodiments, and various changes in form and details may be made therein without departing from the spirit and scope of the present disclosure as defined by the appended claims.

What is claimed is:

1. A method of an electronic device, comprising:
displaying a plurality of identifiers respectively indicating a plurality of electronic devices within a user interface (UI) of an integrated message application associated with a plurality of message applications;
in response to detecting a first input for selecting an identifier among the plurality of identifiers, identifying, among the plurality of message applications, a first message application and a second message application, wherein the first message application and the second message application are associated with another electronic device indicated by the identifier;
displaying, within another UI of the integrated message application changed from the UI, a first tab for communicating with the another electronic device via the first message application within the another UI of the integrated message application and a second tab for communicating with the another electronic device via the second message application within the integrated message application, the another UI further includes a message compose area;
based on selecting the first tab, transmitting a message inputted through the message compose area via the first message application to the another electronic device, and
based on selecting the second tab, transmitting the message inputted through
the message compose area via the second message application to the another electronic device.

2. The method of claim 1, further comprising:
in response to detecting, identifying whether at least one message application which has been used for communicating with the another electronic device indicated by the selected identifier among the plurality of message applications exists or not;
in response to identifying that the at least one message application does not exist, based on identifying the identifier, searching the first application and the second application available for communicating with the another electronic device among the plurality of message applications.

3. The method of claim 2, wherein the first tab is capable of directly accessing the searched the first application, and wherein the second tab is capable of directly accessing the searched the second application.

4. The method of claim 2, further comprising:
identifying whether the identifier is associated with a phone number that is stored in the electronic device; and
if the identifier is associated with the phone number, determining the first application as one of SMS (short message service), LMS (long message service) or MMS(multi-media message service).

5. The method of claim 2, further comprising:
identifying whether the identifier is associated with a message application that differs from the integrated message application; and
if the identifier is associated with the message application, determining the first application as the message application.

6. The method of claim 2, further comprising:
identifying whether the identifier is associated with a phone number that is stored in the electronic device;
if the identifier is associated with the phone number, determining the first application as one of SMS, LMS or MMS;
identifying whether the identifier is associated with a message application that differs from the integrated message application; and if the identifier is associated with the message application, determining the second application as the message application.

7. The method of claim 1, further comprising:
in response to detecting a third input for selecting another tab distinct with the tab among the first tab or the second tab, displaying a message compose area associated with the another tab.

8. The method of claim 1, further comprising:
displaying the transmitted message in a conversation area of the another UI,
wherein the conversation area is used to display a plurality of messages transmitted from the electronic device to the another electronic device regardless of a type of the plurality of message applications.

9. The method of claim 1, further comprising:
based on determining the first message application as a message application that is recently used for communicating with the another electronic device, highlighting the first tab; and
based on determining the second message application as the message application that is recently used for communicating with the another electronic device, highlighting the second tab.

10. The method of claim 1, wherein an integrated message application is associated with at least one of a specific communication protocol, an instant messaging identifier, a specific phone number, and a specific subscriber identity module (SIM).

11. An electronic device comprising:
a memory storing instructions;
a communication module;
a display module; and
a processor, coupled to the communication module and the display module, configured to execute the stored instructions to:
display a plurality of identifiers for respectively indicating a plurality of electronic devices within a user interface (UI) of an integrated message application associated with a plurality of message applications;
in response to detecting a first input for selecting an identifier among the plurality of identifiers, identify, among the plurality of message applications, a first message application and a second message application, wherein the first message application and the second message application are associated with another electronic device indicated by the identifier; and
display, within another UI of the integrated message application changed from the UI, a first tab for communicating with the another electronic device via the first message application within the another UI of the integrated message application and a second tab for communicating with the another electronic device via the second message application within the integrated message application, the another UI further includes a message compose area;
based on selecting the first tab, transmit a message inputted through the message compose area via the first message application to the another electronic device;
based on selecting the second tab,
transmit a message inputted through the message compose area via the second message application to the another electronic device.

12. The electronic device of claim 11, wherein the processor is further configured to execute the stored instructions to:
in response to detecting, identify whether at least one message application which has been used communicating with the another electronic device indicated by the selected identifier among the plurality of message applications exists or not;
in response to identifying that the at least one message application does not exist, based on identifying the identifier, searching the first application and the second application available for communicating with the another electronic device among the plurality of message application.

13. The electronic device of claim 12, wherein the first tab is capable of directly accessing the searched the first application, and
wherein the second tab is capable of directly accessing the searched the second application.

14. The electronic device of claim 12, wherein the processor is further configured to execute the stored instructions to:
identify whether the identifier is associated with a phone number that is stored in the electronic device; and
if the identifier is associated with a phone number, determine the first application as one of SMS (short message service), LMS (long message service) or MMS(multimedia message service).

15. The electronic device of claim 12, wherein the processor is further configured to execute the stored instructions to:
identify whether the identifier is associated with a message application that differs from the integrated message application; and
if the identifier is associated with the message application, determine the first application as the message application.

16. The electronic device of claim 12, wherein the processor is further configured to execute the stored instructions to:
identify whether the identifier is associated with a phone number that is stored in the memory;
if the identifier is associated with the phone number, determine the first application as one of SMS, LMS or MMS;
identify whether the identifier is associated with a message application that differs from the integrated message; and
if the identifier is associated with the message application, determine the second application as the message application.

17. The electronic device of claim 11, wherein the processor is further configured to execute the stored instructions to:
in response to detecting a third input for selecting another tab distinct with the tab among the first tab or the second tab, display a message compose area associated with the another tab.

18. The electronic device of claim 11, wherein the processor is further configured to execute the stored instructions to display the transmitted message in a conversation area of the another UI, and
wherein the conversation area is used to display a plurality of messages transmitted from the electronic device to the another electronic device regardless of a type of the plurality of message applications.

19. The electronic device of claim 11, wherein the processor is further configured to execute the stored instructions to:

based on determining the first message application as a message application that is recently used for communicating with the another electronic device, highlight the first tab; and based on determining the second message application as the message application that is recently used for communicating with the another electronic device, highlight the second tab.

20. The electronic device of claim 11, wherein an integrated message application is associated with at least one of a specific communication protocol, an instant messaging identifier, a specific phone number, and a specific subscriber identity module (SIM).

* * * * *